G. SEGER.
Improvement in Cider-Mills.
No. 115,112.  Patented May 23, 1871.
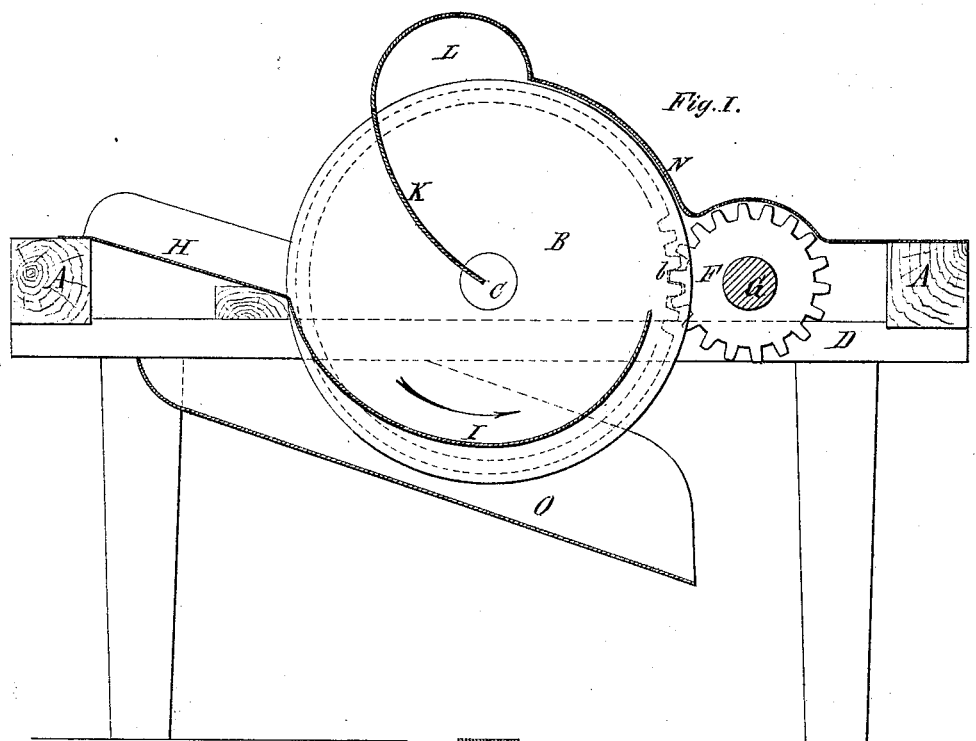
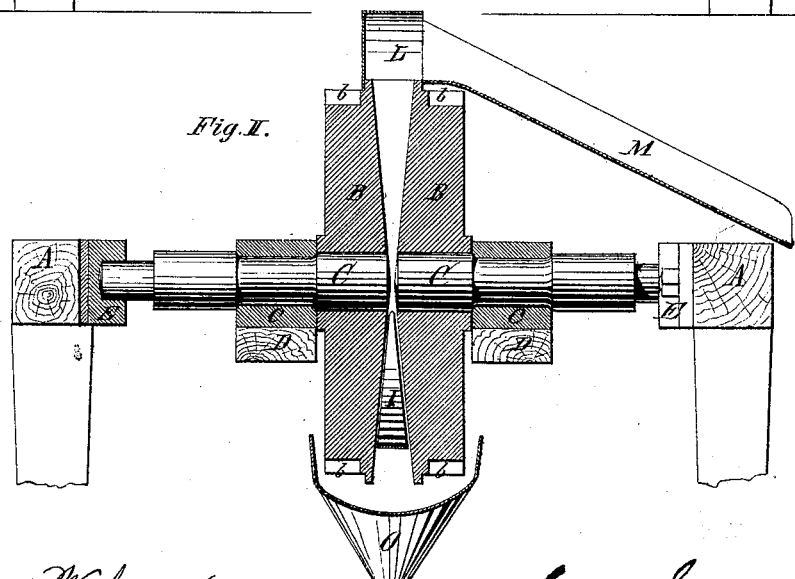

G. SEGER.  
Improvement in Cider-Mills.
2 Sheets--Sheet 2.
No. 115,112.  Patented May 23, 1871.
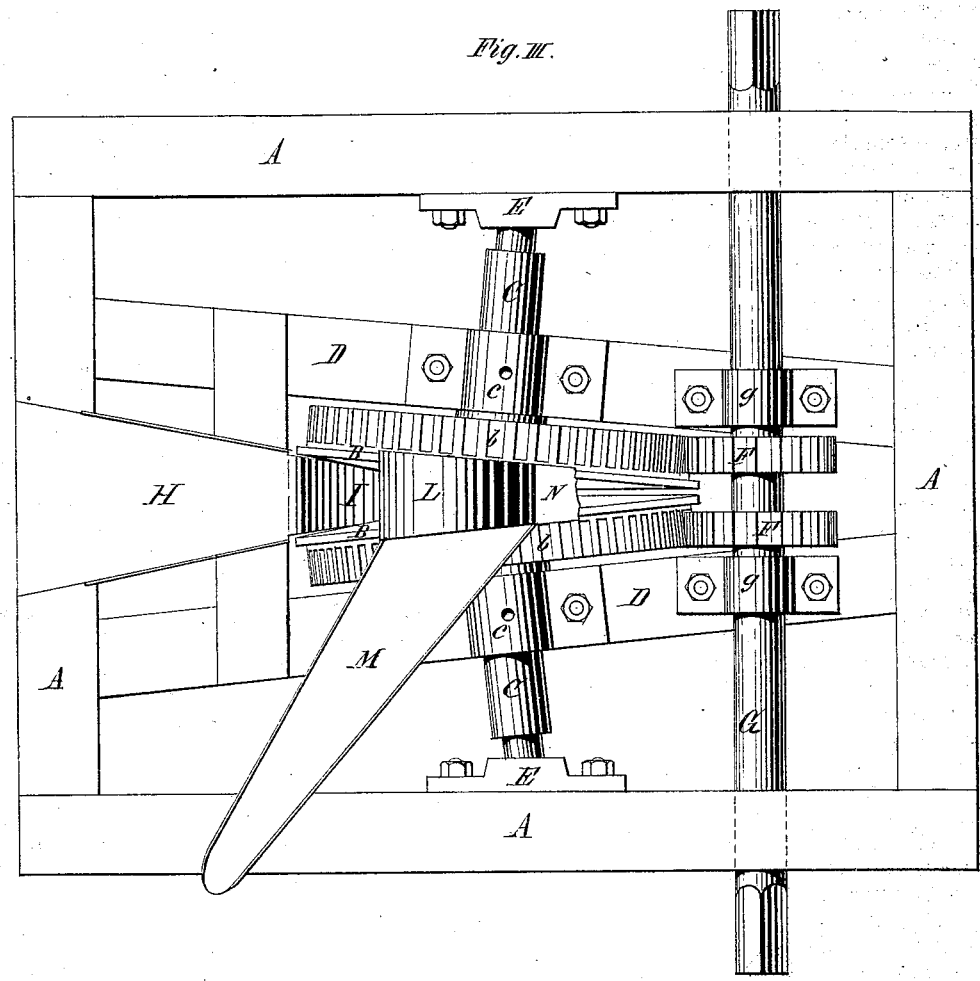
Fig. III.
Witnesses  
Edward Wilhelm  
Jno. J. Bonner
Garret Seger, Inventor  
by Forbush & Hyatt  
his attys

UNITED STATES PATENT OFFICE.

GARRET SEGER, OF HUMBERSTONE, CANADA, ASSIGNOR TO HIMSELF AND O. F. KNISELEY, OF SAME PLACE.

IMPROVEMENT IN CIDER-MILLS.

Specification forming part of Letters Patent No. 115,112, dated May 23, 1871.

I, GARRET SEGER, of Humberstone, Province of Ontario, Canada, have invented certain new and useful Improvements in Cider-Mills, of which the following is a specification:

My improvements relate to that class of cider-mills in which the apples are crushed between two smooth convex disks revolving on horizontal shafts, and have the object to make such machines capable of crushing the apples and separating the juice from the pulp at one single operation. My improvement consists in the combination and arrangement, in a cider-mill with two crushing-disks, of a concave and pulp-scraper and spout, for the purpose hereinafter described.

In the accompanying drawing, Figure I is a sectional elevation; Fig. II is a cross-sectional elevation; and Fig. III, a top plan view of my improved cider mill.

Like letters designate like parts in each of the figures.

A is the frame of the machine, supported on suitable legs. B B are the crushing-disks, constructed with conical faces and gear-rims, b, on their rear side, near the periphery. These disks are arranged obliquely with reference to each other, as clearly shown in Fig. III, so as to gradually diminish the space between their faces as the apples pass between them. The disks B are mounted on horizontal shafts C, resting in pillow-blocks c, supported on timbers D, attached to the frame. The outward ends of the shafts C are held in step-bearings E, fastened to the frame. The disks are revolved by two pinions, F, meshing with the gear-rims b b. They are mounted on a shaft, G, supported in bearings g g, power being applied to said shaft in any ordinary way. H is the feed-board attached to the frame, and I is the concave leading therefrom between the disks, and extending in the form of a crescent to nearly the narrowest point between the two disks, so as to form a bottom for the space between the disks, but leaving at the same time a narrow free space between itself and each disk for the passage of the juice. O is the trough arranged below the crushing-disks for the purpose of receiving the juice. K is the triangular pulp-scraper, extending from the center of the disks upward, and terminating in a box, L, arranged on top of said disks. This scraper fits closely between the disks, so as to remove the pulp thoroughly therefrom as they pass by the same. One of the sides of the box L is open, and receives a spout, M, which is designed to carry the pulp away from the disks. The whole of this construction may be supported by a metallic shield, N, attached to the frame A and covering the gear-wheels, or in any other suitable manner.

The operation of my improvements is as follows: The apples being fed between the crushing-disks from the feed-board H, and the former revolving in the direction indicated by the arrow in Fig. I, the apples follow the concave and are gradually crushed between the disks, the juice falling into the trough below while the pulp is by the concave prevented from escaping downward, and is carried along by the motion of the disks until it comes in contact with the scraper K, which latter arrests the pulp and guides the same upward toward the discharge-spout M, the latter depositing the pulp in a convenient receptacle.

It is evident from the foregoing description that in my improved machine the crushing of the apples and the separation of the juice from the pulp are effected in a single and continuous operation.

I claim as my invention—

In the cider-mill herein shown, the arrangement of the scraper K, hood L, and delivery-spout M, as shown and described.

GARRET SEGER.

Witnesses:
EDWARD WILHELM,
JNO. J. BONNER.